(12) United States Patent
Gangwal

(10) Patent No.: US 7,594,046 B2
(45) Date of Patent: Sep. 22, 2009

(54) DATA PROCESSING IN WHICH CONCURRENTLY EXECUTED PROCESSES COMMUNICATE VIA A FIFO BUFFER

(75) Inventor: Om Prakash Gangwal, Eindhoven (NL)

(73) Assignee: NXP B. V., Eindhoven (NL)

( * ) Notice: Subject to any disclaimer, the term of this patent is extended or adjusted under 35 U.S.C. 154(b) by 669 days.

(21) Appl. No.: 10/552,778

(22) PCT Filed: Apr. 8, 2004

(86) PCT No.: PCT/IB2004/050412

§ 371 (c)(1),
(2), (4) Date: Oct. 12, 2005

(87) PCT Pub. No.: WO2004/092945

PCT Pub. Date: Oct. 28, 2004

(65) Prior Publication Data

US 2007/0133399 A1   Jun. 14, 2007

(30) Foreign Application Priority Data

Apr. 16, 2003  (EP) .................................. 03101030

(51) Int. Cl.
G06F 3/00 (2006.01)
G06F 5/00 (2006.01)
G06F 9/00 (2006.01)
G06F 9/44 (2006.01)
G06F 13/00 (2006.01)
G06K 9/00 (2006.01)
H03K 19/00 (2006.01)

(52) U.S. Cl. .................. 710/52; 382/162; 719/328; 716/16

(58) Field of Classification Search .............. None
See application file for complete search history.

(56) References Cited

U.S. PATENT DOCUMENTS 4,623,997 A   11/1986   Tulpule
5,502,833 A   3/1996   Byrn et al.
5,535,412 A *   7/1996   Nadehara ...................... 711/110
5,765,187 A *   6/1998   Shimizu et al. .............. 711/110
2002/0138685 A1   9/2002   Jones
2005/0243203 A1*   11/2005   Swan ......................... 348/448

FOREIGN PATENT DOCUMENTS

DE   19511774   10/1996

OTHER PUBLICATIONS

"Eclipse: A Heterogeneous Multiprocessor Architecture for Flexible Media Processing", by M.J. Rutten, J.T.J. van Eijndhoven, E.J.D. Pol, E.G.T. Jaspers, P. van der Wolf, O.P. Gangwal and A. Timmer, and published in the IEEE Design and Test of Computers, Special Issue on Embedded Processor Based Designs, editor P. Marwedel, 2002.

* cited by examiner

Primary Examiner—Henry W. H. Tsai
Assistant Examiner—Tushar S Shah

(57) ABSTRACT

A processing circuit executes a data producing process and a data consuming process. The data producing process produces a stream of data, the data consuming process consumes the stream of data concurrently with production of the stream. A first-in first-out buffer passes data from the stream between the data producing process and the data consuming process. The buffer comprises buffer memory, the buffer writes data-items from the stream in circular fashion into the buffer memory. A consuming process interface is arranged to process a command for making a data grain from the stream available to the data consuming process. The interface responds to the command by testing whether addresses of data within the grain to which access has to be gained wrap around in the circular FIFO buffer. The interface copies the grain from the FIFO buffer to the auxiliary memory region, on condition that the addresses wrap around, so that the wrap around is eliminated in the copied grain, The interface returns an indication to the consuming process to read the grain from the FIFO buffer when the addresses do not wrap around inside the grain, or an indication to read from the auxiliary memory region, when the addresses wrap around.

12 Claims, 3 Drawing Sheets

DATA PROCESSING IN WHICH CONCURRENTLY EXECUTED PROCESSES COMMUNICATE VIA A FIFO BUFFER

The invention relates to data processing and in particular to data processing in which concurrently executed processes communicate via a FIFO buffer.

A method of communicating data between concurrently executed processes is described in an article titled "Eclipse: A Heterogeneous Multiprocessor Architecture for Flexible Media Processing", by M. J. Rutten, J. T. J. van Eijndhoven, E. J. D. Pol, E. G. T Jaspers, P. van der Wolf, O. P. Gangwal and A. Timmer, and published in the IEEE Design and Test of Computers, Special Issue on Embedded Processor Based Designs, editor P. Marwedel, 2002. This article will be referred to as "Eclipse".

Eclipse is concerned with media processing (e.g. video image processing), in which a stream of data is passed from one process to another. One important aspect of Eclipse is that it provides an efficiently implementable definition of a generalized interface model for communication and synchronization between different processes. The interface model defines a limited set of primitive functions of an application program interface (API) that must be used to communicate and synchronize. In terms of the primitive functions of this API signal processing tasks can be described functionally in a way that leaves open how various processes will be implemented: by means of computer programs running on the same or different processing elements, or on dedicated hardware processors or a mix thereof. As a result, the interface model increases reusability of signal processing task descriptions.

To achieve this result it is necessary that the primitive functions of the API for communication and synchronization are carefully chosen so that they can be efficiently implemented. The interface mode assumes a producer process that produces data in a stream and a consumer process that uses data from the stream and is able to execute concurrently, in the sense that the consuming process uses data from the stream when the producing process yet has to produce further data in the stream.

The processes typically produce and consume the data in grains. A minimum size grain is for example a single pixel value of an image and examples of larger size grains are image lines or 8×8 pixel blocks. Different processes may use different grain sizes. For example, a process that needs complete lines for processing, but receives 8×8 blocks will have to use grains of 8 lines. During processing the consuming process steps from one grain to the next, and between the steps the consuming processes data only from within a current grain.

Eclipse uses a FIFO buffer interface to communicate data from the stream between the producing process and the consuming process. The producing process writes data into a FIFO buffer memory a grain at a time and the data is read from the FIFO buffer a grain at a time for use by the consuming process, in the sequence in which the grains have been written. For this mechanism Eclipse defines the following primitive commands in terms of which communication and synchronization must be expressed in signal processing tasks:

Write, Read, GetSpace and Putspace

The write command for a FIFO buffer requires (a pointer to) a grain of output data and the size of the write grain as parameters (the size may also be implicit). The read command takes a pointer to a memory region for the data and a size of the read grain as parameter. After execution of the read command the data from the read grain will have been copied from the FIFO buffer to the memory region pointed at by the pointer. The GetSpace command is used to indicate that a next grain is to be read or written. The GetsSpace command takes the size of the grain as parameter and returns a flag to indicate whether the requested space is available. This flag may be used to determine whether a process should pause. In response to the GetSpace command the space of is reserved for the calling process. The PutSpace command is used to indicate that reading or writing of a grain has finished and that the FIFO buffer area for the grain need no longer be reserved for the calling process.

Reusability is realized by basing the description of communication and synchronization in task descriptions on this set of commands and by implementing different implementations of task descriptions on different implementations of this set of commands A typical implementation of a FIFO buffer interface uses a memory that is addressed in circular fashion. Data from each next grain is written at a next higher series of addresses until the end of the address range of the buffer memory is reached. In that case data from the next grain is written at a lowest series of addresses in the memory. However, such a FIFO buffer interface leads to complications when different grain sizes are used. When the grain size of the consuming process is larger than that of the producing process, for example, it is possible that the addresses within a grain "wrap around" (jump from one boundary of the buffer address range to the other) in some of the grains. This complicates addressing of the data in the grains by the consuming process.

Eclipse has solved this problem by using a read command that has as a parameter a pointer to a memory to which data from the FIFO buffer will be copied. The consuming process will read the data from this region. In this solution all data from a grain from the FIFO buffer is copied to a local memory for a grain of the consuming process, to remove the wrap-around of the addresses. Thus address complications due to wrap around are confined to copying, leaving the consuming process free to address data within the grain with maximum efficiency. However, copying introduces overhead costs for processing.

Another possible solution, which has not been used in the API of Eclipse, is that the consuming process accesses data within the grain directly from the FIFO buffer memory, using an address conversion for each address to ensure that the address is adapted when wrap around is needed. This eliminates the overhead of copying, but it introduces overhead each time data is addressed. When the consuming process is not adapted to the buffer memory, the consuming process has to supply an address of data within the grain to the API call for conversion, each time when data is addressed.

Accordingly, it is an object of the invention to provide for an application program interface definition for use in signal processing task descriptions, and for implementations of that application program interface definition, that make it possible to minimize the overhead during execution of processes that communicate grains of data via a FIFO buffer memory that has addresses that wrap around.

More particularly, it is an object of the invention to make it possible to minimize such overhead for processes that use mutually different grain size.

The data processing apparatus according to the invention is set forth in Claim 1. A consuming process gets access to the circular buffer via an application program interface function for getting access to data from a grain. According to the invention, the function returns an indication whether the consuming process should read the data directly from a circular FIFO buffer or from an auxiliary memory, the function returns the latter indication when the addresses inside the grain wrap around in the circular FIFO buffer. When the addresses inside the grain wrap around in the FIFO buffer the data from the grain is copied to the auxiliary memory.

The grain size and the auxiliary buffer are defined particular to the consuming process, so that the grain size for the consuming process may differ from the grain size of a producing process that writes to the FIFO buffer. The auxiliary buffer is selected so that it contains sufficient space for writing one grain from the stream. Because the auxiliary buffer is particular to the consuming process it need not be overdimensioned to be able to handle all possible grain sizes. Preferably, the consuming process itself sets the grain size and the auxiliary buffer using a command to the application program interface, for example as arguments of the command.

When a command of this type is included in an application program interface the command makes it possible to write a program for a signal processing task so that all access for reading from the circular FIFO buffer is expressed in terms of this command. This makes the implementation of the FIFO buffer transparent to the program that specifies the signal processing task. As a result, the same program may be used for different implementations in which the processes that make up the signal processing task are distributed differently over different processors. Implementations for such different distributions are realized by implementing the processes in the appropriate processors and exchanging the application program interface commands that are used to handle access to the circular FIFO buffer, as appropriate to the location of the processors that execute the processes. Thus the distribution is transparent in the specification of the signal processing task.

Because the application program interface command provides for alternative use of data from a grain direct from the circular FIFO buffer or from the auxiliary memory, this transparency is realized with highly efficient access to the FIFO buffer.

These and other objects and other advantageous aspects of the invention will be described using the following figure.

Figure 1:
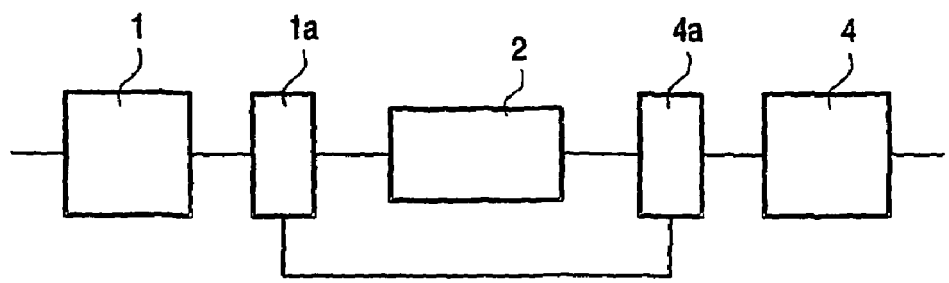
FIG. 1 shows an organizational structure of data processing

FIG. 1 shows an organizational structure of data processing, using a first process 1, a second process 4, a FIFO buffer memory 2 and application program interfaces 1a, 4a between FIFO buffer memory 2 and processes 1, 4 respectively. In operation, first process 1 produces a stream of data and writes data from this stream into FIFO buffer 2 memory. Data is produced and consumed in grains, which each typically contain a number of separately addressable words. FIFO buffer memory 2 receives data from a grain before data from a next grain is received on so on from first process 1 and makes data from a grain at a time successively available to second process 4, in the order in which the grains or groups of grains were received from first process 1.

Processes 1, 4 are typically software implemented processes which interface to FIFO buffer 11 via application program interfaces 1a, 4a. That is, processes 1, 4 do not manage details of the FIFO buffering process directly, but call application program interface functions that manage these details. Although the structure of FIG. 1 shows only two processes 1, 4 for the sake of clarity it should be understood that in practical applications many more processes may be involved, which communicate data via a multitude of FIFO buffers.

Figure 2:
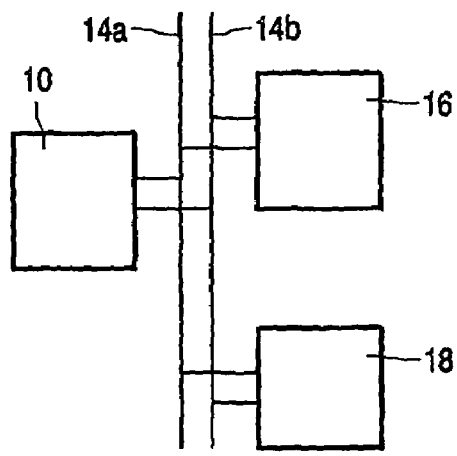
FIG. 2 shows a data processing apparatus

FIG. 2 shows a typical processing apparatus, for implementing the structure of FIG. 1. The processing apparatus contains a first processing element 10, a second processing element 16 and a memory 18 coupled via a communication infrastructure 14a, b. A bus may be used for example as a communication infrastructure. First processing element 10 is programmed to execute first process 1 and functions of application interface 1a. Second processing element 16 is programmed to execute second process 4 and functions of application interface 4a. Typically the apparatus is implemented as an integrated circuit device that contains at least the processing elements and the bus and preferably also the memory.

In operation storage locations from memory 18 are used for FIFO buffer memory 2. A region of addresses, from a minimum address Amin to a maximum address Amax is used to store FIFO buffered data. The application interface for accessing FIFO buffer memory defines the functions Read, Write, GetSpace and Putspace.

By means of a GetSpace call and a Write call first process 1 supplies a grain of data to a function of application program interface 1a, which writes the data into n memory locations with addresses A1..An in the range Amin to Amax (the integer n represents the number of addressable data-items in the grain). When first process supplies a next grain, the data is written into locations with addresses An+1 ... A2n and so on, until Amax is reached. In that case application program interface 1a writes the data from the next grain into locations with addresses Amin ... Amin+n−1, or, if the address Amax is reached somewhere inside the grain, application program interface 1a writes the subsequent part of the grain in locations with addresses starting from Amin. This is called wrapping around, or writing in circular fashion. When such writing would cause data from an earlier grain to be overwritten before it has been used by second process 4, application interface 1a signals that FIFO buffer memory 2 is "full", causing execution of first process 1 to pause until second process 4 has finished reading that data that will be overwritten.

Second process 4 accesses data from a grain at a time using a GetSpace call and a Read call. Once processing second process 4 finishes addressing data from the grain, second process 4 calls application interface 4a to receive a next grain. The size of the grains accessed by second process 4 may differ from those of the grains of first process 4. For example, each grain of second process 4 may consist of an integer number m of grains of first process 1. When second process 4 is ready to process data from a next grain it calls application program interface 4a. The Read call Pointer to data buffer=Read(..., pointer to additional memory)

has a pointer to an additional region of buffer memory as an argument and returns a pointer to a buffer. Other arguments are not shown because they are not essential, but these arguments may include a grain size, a processing task identification and a FIFO identification. Second process 4 supplies the pointer to an additional region of buffer memory in memory 18 to interface 4a. This region has at least the size needed to store the data of one grain of second process 4.

Figure 3:
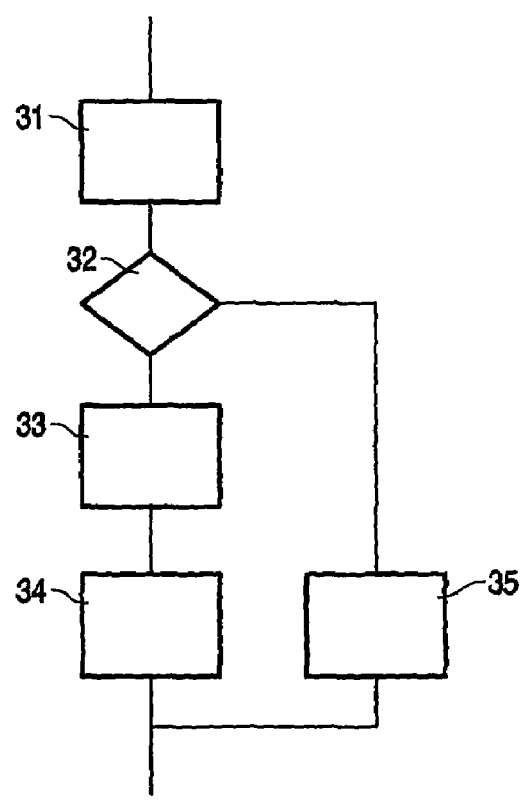
FIG. 3 shows a flow chart of an interface program

FIG. 3 shows a flow chart of the operation of application interface 4a when it receives a call from second process 4 to receive a next grain from FIFO buffer memory. In a first step 31, application program interface 4a accepts the call to receive this next grain when a data grain is available for reading; until that time first process 4 has to pause. In a second step 32 application program interface 4a tests whether the addresses of the data from this grain wrap around inside the grain. If so, application program interface 4a executes a third step 33 in which it copies the data from this next grain to the additional region pointed at by the pointer that has been supplied with the call. During copying the address wrap around is removed, that is, the part of the data from the grain that is stored from address Amin in the FIFO buffer area is stored in the additional region at addresses following those of the data from the grain at the end of the FIFO buffer area. In a fourth step 34 application program interface 4a returns the pointer to the additional region to second process 4.

If application program interface 4a finds in second step 32 that the data does not wrap around in the FIFO buffer area, application program interface 4a executes a fifth step 35, returning a pointer to the locations in the FIFO buffer area where the data of the grain is stored.

Thus, second process 4 both supplies and receives a pointer to application program interface 4a Application program interface 4a returns the supplied pointer or a pointer to part of FIFO buffer to second process 4, dependent on the way the next grain is stored. The supplied pointer is returned only when it is necessary to avoid split addressing due to wrap around. The application program interface that is used to ensure reusability contains a primitive function Read to signify this.

Pointer to data buffer=Read(. . . , pointer to additional memory)

In terms of a high level program the Read function might be implemented for example as BufferPointer Read(BufferPointer P)

```
{    int end_of_grain= current_offset+grain_size;
         if (end_of_grain<max) return
         base_address_of_FIFO_buffer+current_offset;
         for (int i=0;i<max-current_offset;i++)
    P[i]=FIFO_buffer[i+current_offset];
         for (int i=max-current_offset;i<grain_size;i++)
    P[i]=FIFO_buffer[i+current_offset-max];
         return P;
}
```

Herein max, current_offset and grain_size are parameters that represent the size of the FIFO buffer, the position of the start of the grain in the FIFO buffer and the size of the grain respectively. The values of these parameters are assumed to have been defined elsewhere. Optionally, one or more of these parameters may be passed as arguments of the function Read. It should be noted that for some reasons (for example to avoid wrap around on writing to the FIFO buffer) the parameter max may vary autonomously as a function of time.

The invention has been described in terms of a "Read" function that takes a pointer to an additional memory region as argument, passed by consuming process 4. As an alternative consuming process 4 may set this pointer once for a series of Read operations. As another alternative a predetermined pointer may be used, as defined by the application program interface. The use of a pointer defined by consuming process 4 has the advantage that the amount of space that needs to be reserved in the additional memory region can be adapted to the grain size used by consuming process 4. Thus, it is not necessary to reserve a "worst case" size, which might involve a duplication of the FIFO buffer size. The use of a pointer defined as an argument of the Read function has the advantage that the grain size may be adapted dynamically without overhead for each call of the Read function.

It should be noted that it makes no sense to supply pointers to different additional regions values as argument to the successive Read function calls with the purpose of ensuring that data is stored in the different regions. This is because the application may not rely on the assumption that data is copied to the additional region. This will only exceptionally be the case.

Although the invention has been described in terms of application program interfaces 1a, 4a that are implemented as programs executed by first processing element 10 and second processing element 16 respectively, it will be understood that one or both of these application program interfaces may run on different processing elements. In fact, first and second process 1, 4 may run on the same processing element together with the application program interfaces 1a, 4a. In another embodiment, part or all of FIFO buffer memory 2 and application program interfaces 1a, 4a may be implemented as dedicated hardware.

Figure 4:
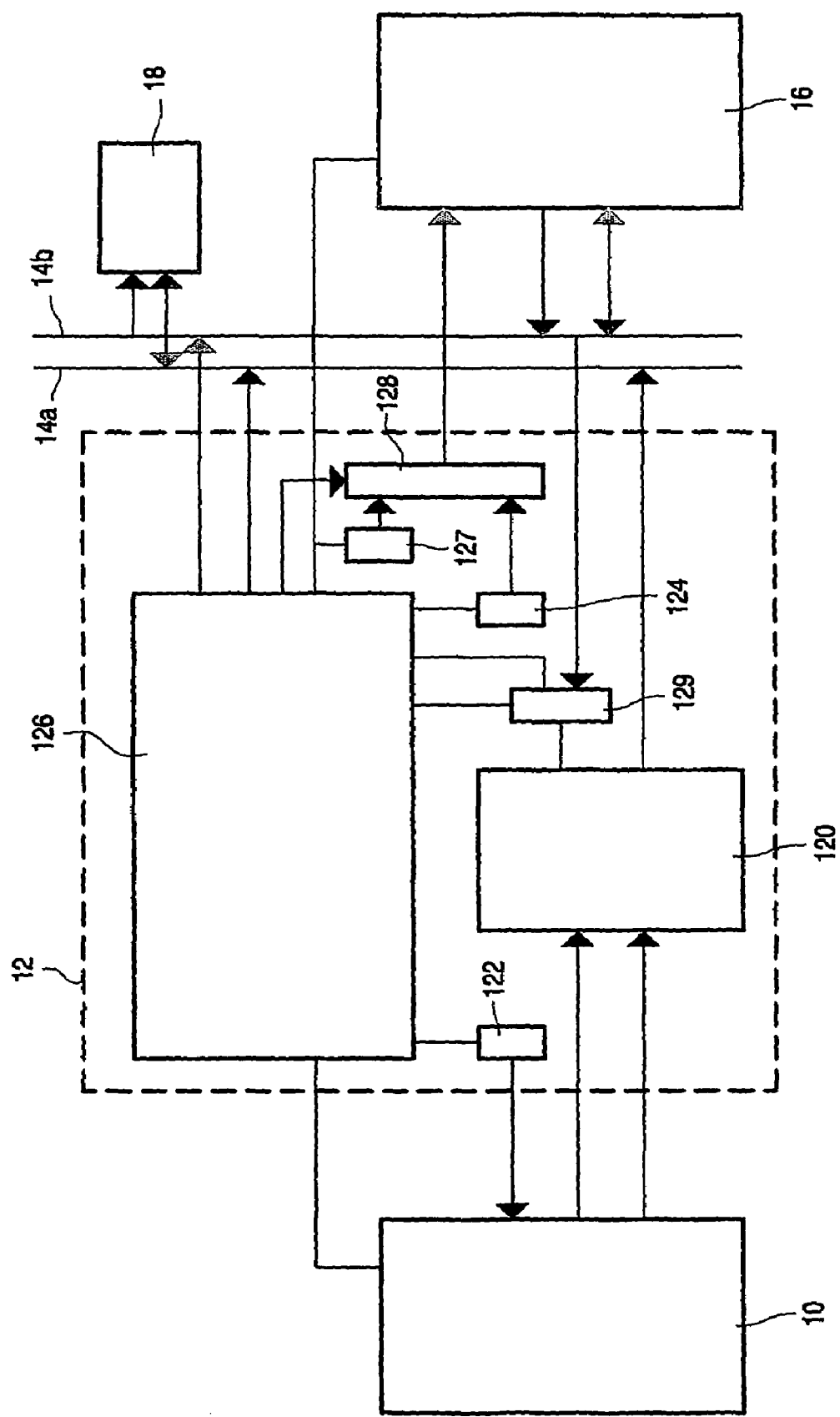
FIG. 4 shows a data processing apparatus with a FIFO buffer

FIG. 4 shows an example of a hardware implementation of FIFO buffer memory 2 and the interface to second process 4. In the hardware implementation a FIFO buffer unit 12 is coupled between first processing element 10 and bus 14a, b. FIFO buffer unit 12 contains a buffer memory 120, a FIFO input pointer register 122, a FIFO output pointer register 124, an application call processor 126, an additional buffer pointer register 127, a return pointer multiplexer 128 and a FIFO output address multiplexer 129. Preferably the hardware implementation is realized in an integrated circuit that contains all components, except possibly the memory, which may be external.

In operation, first processing element 10 generates a call signal to application call processor 126 when a new grain is to be written. When memory space is available in buffer memory 120 application call processor 126 sets FIFO input pointer register 122 to the starting address for the grain in buffer memory 120 and acknowledges to first processing element 10 that writing may start. First processing element 10 reads the starting address from FIFO input pointer register 122 and writes the data from the grain into buffer memory 120 starting from the starting address.

Both buffer memory 120 and memory 18 can be addressed by second processing element 16 via bus 14a, b. Dependent on the address data second processing element 16 reads from buffer memory 120 or from memory 18. When a new grain is to be read second processing element 10 generates a call signal to application call processor 126. The call is accompanied by the address of an additional region in memory 12. In response to the call application call processor 126 tests whether the grain is fully available and when this is the case sets FIFO output pointer register 122 to the starting address for the grain in buffer memory 120.

However, before acknowledging the call, application call processor 126 tests whether the addresses of the grain wrap around. If so, application call processor 126 addresses buffer memory to output the data from the grain and application call processor 126 addresses memory 18 to store the data from of the grain buffer memory 120, using addresses from the address of the additional region. Application call processor 126 controls return pointer multiplexer 128 to output either the address of the additional region or the starting address from FIFO output pointer register 122. Finally application call processor 126 acknowledges the call.

When the call has been acknowledged FIFO output address multiplexer 129 permits second processing element to read data from buffer memory 120. Second processing element 10 reads the starting address received from return pointer multiplexer 128 and addresses data in the grain according to the pointer that is thus returned.

It will be appreciated that FIG. 4 merely shows an exemplary embodiment that makes the choice between the pointers explicit. Many alternatives exist for supplying the correct pointer to second process 4. For example, instead of a pointer a flag signal may be supplied that indicates from which of two locations the pointer must be read, or the required pointer may be generated internally in application call processor 126 and supplied from there in return instead of keeping it in a register selected by multiplexer 128. Instead of a register and a multiplexer 128 a memory location may be used in which the appropriate pointer information is written under control of application call processor 126. As has been noted in the context of the software implementation, it is not necessary that processing element 16 supplies the address of an additional region in memory 18 with each call. Instead the address may be supplied in a separate transaction, to store the address in register 127 for later use during any number of calls. Furthermore, the additional region may be part of a larger memory that contains FIFO buffer memory 120. Memory 18 and buffer memory 120 may in fact be part of the same larger memory.

It will be realized that writing into the FIFO buffer may similarly make use of an auxiliary memory, so that the producing process is made to write into auxiliary memory when the addresses inside a grain wrap around and directly into the FIFO buffer when the addresses do not wrap around. In this case the producing process first makes application program interface call to receive a pointer for writing data from a grain. The call has an auxiliary memory pointer as argument. In response to the call the application program interface reserves space for the grain in the FIFO memory. In return to the call the application program interface returns the pointer received as argument or a pointer into the FIFO memory, selected dependent on whether the addresses for the grain wrap around in the FIFO memory. The producing process then writes the data of the grain into the memory that the returned pointer points to. When completion of the grain is signaled the application program interface copies the data from the auxiliary memory region if the addresses in the FIFO buffer wrap around.

This reduces overhead on the producing side of the FIFO buffer. However, it will be appreciated that this reduction may be less significant than for the consuming side, when data is generally written only once and read more often, or when not all data needs to be read by the consuming process. Consequently, a significant improvement is already achieved when the invention is applied only on the output side, without the overhead needed for applying it on the input side.

In any case, such an improvement on the input is not necessary when the FIFO buffer size is an integer multiple of the grain size on the consuming side. Similarly, such an improvement is not necessary when the application interface temporarily reduces or increases the size of the FIFO buffer to ensure that on writing the end of a grain coincides with the end of buffer memory.

Although the invention has been described with increasing addresses for successive grains, but it will be understood that decreasing addresses may be used instead. In this case the auxiliary memory region is used when a grain reaches the lowest address of the FIFO buffer. Similarly, although a bus has been shown as a communication structure between the processors that execute the processes, the auxiliary memory and the FIFO buffer, it should be understood that other types of communication structures may be used for communicating between part or all of these elements, for example networks, so that instead of bus addresses network addresses will be used.

In a conventional way, as described for Eclipse, during design of a signal processing task a number of processes is specified, for example by means of high level language program code, for example C program code. Data streams are communicated between the processes and the processes are designed to produce and consume the data streams concurrently. Communication and synchronization between processes is realized by calls to an interface functions for interfacing to a FIFO buffer.

Figure 5:
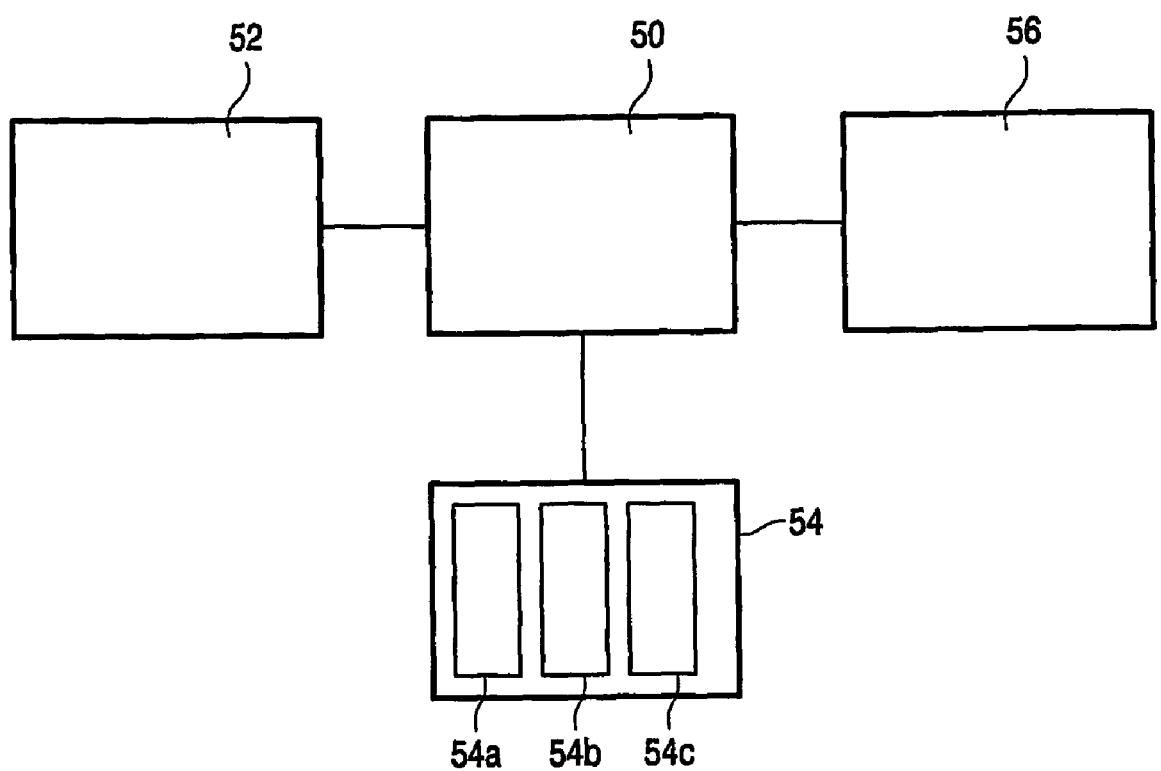
FIG. 5 shows a flow chart of compilation

FIG. 5 shows machine for compiling a program. The machine contains a processor 50, an input device 52 for inputting the programs, a storage device 54 that stores a plurality of libraries 54*a-c* of functions and a target programming unit 56. Each library 54*a-c* contains implementing instructions for executing interface functions, like the Read function described above, each library for a respective type of target machine. In one implementation for example, the library functions support a software implementation using a single memory for both producing and consuming processes and the FIFO buffer, whereas in another library the functions support a hardware implementation of FIFO buffering and/or communication of FIFO buffered data between different processors.

In operation, in a first step, processor 50 reads the a program from input device 52 (the program may be stored intermediately, for example in storage device 54). The program contains a call to a library function to get access to data from a FIFO buffer, and to use a result of the call to control whether subsequent instructions in the program read or write from or to the FIFO buffer directly or from or to an additional buffer, preferably in an additional buffer that was specified by instructions in the program.

In a second step, processor 50 parses the program and generates object code that contains instructions that have to be executed to implement the program. In the second step, processor 50 also determines whether the program contains calls to interface library functions of the type of the "Read" function described in the preceding. In a third step, processor 50 determines which one of the libraries 54*a-c* should be used, this is done for example dependent on a signal, like a linking option that indicates the type of target machine. In the third step processor 50 links the object code with instructions from the selected one of the interface libraries 54*a-c*, so that the calls to the Read function in the object code will cause execution of instructions form the selected library that implement the Read function. In a fourth step 54 processor 10 sends the linked code to target programming unit 56, which, for example, loads the linked code into a target processor for execution (or used the code control part of manufacture an integrated circuit programmed to execute the program). Although preferably different libraries with different implementations of the Read function are provided, so that the same program may linked for different types of machine, it will be understood that one library suffices if processor 10 provides for execution on only one type of target machine.

It will be appreciated that each step is conventional, except that use is made of a novel library or libraries of interface functions, which contains a library Read function for getting access to a FIFO buffer, where the Read function returns an indication whether the instructions generated for the program should read or write directly from or to the FIFO buffer memory or from or to an additional buffer, preferably in a buffer that was specified by instructions in the program. It will also be appreciated that this function need not necessarily be linked in the third step. Instead a call to a system function that is supported at run time may be used, or instructions that command hardware for FIFO buffering may be included as a result of the call.

According to the invention the interface functions include a Read function that returns a selection of a buffer for reading, the selection indicating either that the FIFO buffer memory should be used directly or that the auxiliary memory region should be used. Subsequently the task specification is used to control manufacture of hardware and/or a program of machine instructions to implement the specification, as described for Eclipse, except that the Read command is implemented in an architecture as described or equivalents thereof. Dependent on the type of implementation, and in particular on the choice of hardware distribution of the processes an implementation of the Read function is selected.

The invention claimed is:

1. A data processing apparatus, comprising:
   a processing circuit arranged to execute a data producing process and a data consuming process, the data producing process producing a stream of data and the data consuming process consuming the stream of data concurrently with production of the stream;
   processing memory accessible to the data consuming process;
   a first-in first-out circular buffer unit for passing data from the stream between the data producing process and the data consuming process, the circular buffer unit comprising buffer memory and writing data-item from the stream in a circular fashion into the buffer memory; and
   a consuming process application program interface (API) of the circular buffer unit, the consuming process API being arranged to:
      access an auxiliary memory region accessible to the data consuming process,
      process a command for making a data grain from the stream available to the data consuming process,
      respond to the command by testing whether addresses of data within the grain to which access has to be gained wrap around in the buffer memory,
      copy, in response to detection that the addresses wrap around, the entire grain from the buffer memory to the auxiliary memory region, so that the wrap around is eliminated in the copied grain, and
      return a pointer to the consuming process indicating a location in the buffer memory from which to read the entire grain when the addresses do not wrap around inside the grain, or a pointer indicating a location of the auxiliary memory region from which to read the entire grain when the addresses wrap around.

2. A data processing apparatus according to claim 1, wherein the consuming process is arranged to select an address of the auxiliary memory and a grain size as part of the command.

3. A data processing apparatus according to claim 1, wherein the data producing process and the data consuming process are arranged to use a first and second grain size for sending data to and receiving data from circular buffer unit respectively, the first and second grain size differing from one another.

4. A data processing apparatus according to claim 1, wherein the data producing process s arranged to use variable grain sizes for sending data.

5. A data processing apparatus according to claim 4, wherein a first grain size and a size of the circular buffer unit are selected so that addresses of the data in the circular buffer unit always wrap around between successive grains of the first gain size.

6. a data processing apparatus according to claim 1, further comprising:
   a further processing memory accessible to the data producing process for producing the data stream; and
   a producing process application program interface (API) of the circular buffer unit, arranged to:
      receive a further auxiliary memory region selection for the data producing process,
      process a further command for outputting an output data grain from the stream,
      respond to the further command by testing whether addresses of data within the output grain will wrap around in the buffer memory,
      return a pointer indicating a location in the buffer memory to which the producing process writes the entire grain when the addresses do not wrap around inside the grain, or a pointer indicating a location of the further auxiliary memory region to which the producing process writes the entire grain when the addresses wrap around, and
      copy, in response to detection that the addresses wrap around, the entire grain from the further auxiliary memory region to the buffer memory so that the wrap around is created in the copied grain.

7. A data processing apparatus, comprising:
   a processing circuit arranged to execute a data producing process and a data consuming process, the data producing process producing a stream of data and the data consuming process consuming the stream of data concurrently with production of the steam;
   processing memory accessible to the data producing process;
   a first-in first-out circular buffer unit for passing data the stream between the data producing process and the data consuming process, the circular buffer unit comprising buffer memory and writing data-items from the stream in a circular fashion into the buffer memory; and
   a producing process application program interface (API) of the circular buffer unit, the producing process API being arranged to:
      access an auxiliary memory region accessible to the data producing process,
      process a command for making memory available to the data producing process for writing a produced grain,
      respond to the command by testing whether addresses of data within the grain for which memory has to be made available wrap around in the circular buffer memory, and
      return a pointer to the producing process indicating a location in the buffer memory to which to write the entire grain when the addresses do not wrap around inside the grain, or a pointer indicating a location of auxiliary memory region to which to write the entire grain when the addresses wrap around.

8. A machine implemented method for implementation of a signal processing task comprising concurrently executing processes between which a data stream is communicated via a circular buffer memory, the method comprising:
   providing an application program interface (API) that provides for selectable definition of a grain size and an auxiliary memory region, the API including a function to be called by a data consuming one of the processing to gain access to a grain of data stored in the buffer memory, wherein the function is arranged to:

test whether addresses of the grain to which access has to be gained wrap around in the buffer memory, copy the entire grain from the buffer memory to the auxiliary memory region when the addresses wrap around in the grain, so that the wrap around is eliminated in the copied grain, and return, as a result of the call, a pointer to the consuming one of the processing indicating a location in the buffer memory from which to read the entire grain when the addresses do no wrap around inside the grain, or a pointer indicating a location of the auxiliary memory region from which to read the entire grain when the addresses wrap around in the grain;

receiving a specification of the signal processing task;

identifying a call to said function in the specification of the signal processing task; and implementing the call using the function from the API.

9. A machine implemented method according to claim 8 wherein the API hides a distribution of processes over processing elements from the specification of the processing task, the implementation of the function being selected according to the distribution.

10. A machine implemented method according to claim 9 the method further comprising:

generating integrated circuit manufacturing control information for implementing the machine implementation; and manufacturing an integrated circuit under control of the integrated circuit manufacturing control information.

11. A computer readable medium comprising an application program interface (API) for accessing a circular FIFO buffer, the API providing for selection of a grain size for an application program that accesses data from the circular FIFO buffer and for definition of an auxiliary memory region for the application program, the API comprising a function to be called from the application program for gaining access to a region from the circular FIFO buffer, the function being arranged to:

test whether addresses of data within the grain to which access has to be gained wrap around in the circular FIFO buffer;

copy the entire grain from the FIFO buffer to an auxiliary memory region when the addresses wrap around inside the grain, so that the wrap around is eliminated in the copied grain; and return, as a result of the call, a pointer indicating a location in the FIFO buffer from which to read the entire grain when the addresses do not wrap around inside the grain, or a pointer indicating a location of the auxiliary memory region from which to read the entire grain when the addresses wrap around inside the grain.

12. a computer readable medium containing a program of instructions for executing the method of claim 7.

* * * * *